United States Patent
Kim

(10) Patent No.: US 6,477,389 B1
(45) Date of Patent: Nov. 5, 2002

(54) METHOD FOR COMPENSATING FOR TRANSMISSION POWER DEVIATIONS OF CHANNELS IN A MOBILE PHONE

(75) Inventor: Hak-Hwan Kim, Kumi-shi (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/465,138

(22) Filed: Dec. 16, 1999

(30) Foreign Application Priority Data

Dec. 16, 1998 (KR) ............................................. 98-55406

(51) Int. Cl.⁷ ............................. H04B 7/00; H04Q 7/20
(52) U.S. Cl. ...................... 455/522; 455/67.1; 455/450
(58) Field of Search ................................ 455/522, 115, 455/127, 572, 67.1, 226.1, 450, 509, 69, 226.2, 234.1, 250.1, 254; 375/297, 345

(56) References Cited

U.S. PATENT DOCUMENTS

| | | | |
|---|---|---|---|
| 5,056,109 A | * 10/1991 | Gilhousen et al. | 370/342 |
| 5,627,857 A | * 5/1997 | Wilson | 375/219 |
| 5,881,376 A | * 3/1999 | Lundberg et al. | 455/226.1 |
| 6,018,650 A | * 1/2000 | Petsko et al. | 455/234.1 |

* cited by examiner

*Primary Examiner*—Dwayne Bost
*Assistant Examiner*—Gregory V. Old

(74) *Attorney, Agent, or Firm*—Dilworth & Barrese, LLP

(57) ABSTRACT

A method for compensating transmission power deviations of channels in a mobile phone using adjustment channels, which is capable of minimizing transmission power deviations of channels while efficiently compensating for those transmission power deviations. The adjustment channels are selected from channels for mobile phone services while including a reference one of available channels allocated to the mobile phone from the channels for mobile phone services, the number of the adjustment channels being less than the number of the allocated available channels. Respective transmission automatic gain control (AGC) level values for the adjustment channels are stored in the non-volatile memory of the mobile phone. The method involves an offset value processing procedure for reading out the transmission AGC level values from the non-volatile memory, and deriving offset values corresponding to respective differences between the transmission AGC level value of the reference channel and respective transmission AGC level values of the remaining adjustment channels, and a compensation value processing procedure for deriving a compensation value for a currently available one of the allocated available channels, based on offset values of upper and lower limit adjustment channels, located above and below the currently available channel, respectively, a channel span between the currently available channel and the lower limit adjustment channel, and a channel span between the upper and lower limit adjustment channels.

23 Claims, 4 Drawing Sheets

METHOD FOR COMPENSATING FOR TRANSMISSION POWER DEVIATIONS OF CHANNELS IN A MOBILE PHONE

BACKGROUND OF THE INVENTION

1. Field of the Invention

The present invention relates to a mobile phone, and more particularly to a method for minimizing transmission power deviations of channels in a mobile phone.

2. Description of the Related Art

Typically, a mobile phone uses particular channels for mobile phone services allocated thereto. For instance, 20 channels are allocated as available channels for cellular mobile communications in Korea. These available channels are selected from advanced mobile phone service (AMPS) channels. The AMPS channel numbers of such available channels are 1011, 29, 70, 111, 152, 193, 234, 275, 316, 363, 404, 445, 486, 527, 568, 609, 650, 697, 738, and 779.

Transmission power for each available channel in a mobile phone should meet a specifically made standard tolerance. In a mobile phone, however, transmission power may vary among different channels even at the same automatic gain control (AGC) level because the frequency characteristics of the radio frequency (RF) module used in the mobile phone may vary among those channels. Furthermore, even in the case of mobile phones of the same model manufactured by the same manufacturer, a difference in transmission power may exist for the same channel because those mobile phones have different hardware characteristics. Transmission power variations among different channels or transmission power differences among different phones for the same channel are called "transmission power deviations of channels". When the transmission power deviations of channels is high, errors in transmission power such as generation of maximum power or an open loop on a certain channel may occur.

In order to minimize such transmission power deviations of channels, the manufacturer may conduct, for each phone manufactured, a measurement of transmission power for each available channel while varying the AGC level, and then adjust the transmission power for each available channel to an optimal level, based on the measured transmission power. In this case, transmission AGC levels corresponding to the optimal transmission power are stored in a non-volatile memory and they are used for available channels during a practical use of the phone set. For the non-volatile memory, an electrically erasable and programmable ROM (EEPROM) is typically used.

However, a lot of time is taken for the above mentioned method in which transmission AGC levels are obtained by conducting, for each phone, a measurement of transmission power for all available channels, which are typically 20 in number, and then conducting an adjustment of transmission power based on the measured transmission power. Each transmission AGC level relevant to available channels is stored in a non-volatile memory. As a result, the non-volatile memory area in use increases according to the number of available channels.

In order to reduce the above mentioned problem, a method is proposed in which adjustment channels are used, the number of which is less than the number of available channels. That is, optimum transmission AGC level values are derived only for the adjustment channels, and then stored in the non-volatile memory of the portable phone. Using these stored AGC level values, the optimum transmission power of available channels for a mobile hone may be determined when the mobile phone is used in practice. The determination of optimum transmission power is made only for the currently available channel, based on the stored transmission AGC level values. This is because the current available channel may vary in optimum transmission power depending on the characteristics of the phone hardware. Thus, the number of channels for which certain processes are required in the process of manufacturing mobile phones is reduced. These processes include measuring transmission power, adjusting the transmission power, deriving transmission AGC levels of those channels in association with the adjusted transmission power, and storing the derived transmission AGC levels in a non-volatile memory. Accordingly, the above process is simplified, thereby reducing the above mentioned problems.

However, when this method is used, it is necessary to accurately and efficiently adjust or compensate for the transmission AGC levels stored in the non-volatile memory for the currently available channel. If not, high transmission power deviations of channels may result in errors in transmission power in practical use even though the problems involved in the manufacture of the mobile phone are eliminated.

SUMMARY OF THE INVENTION

One object of the present invention is to provide a method for minimizing transmission power deviations of channels. Another object of the present invention is to provide a method for efficiently compensating for transmission power deviations.

In accordance with the present invention, this object is accomplished by providing a method for compensating transmission power deviations of channels in a mobile phone using adjustment channels selected from channels for mobile phone service, while including a reference channel allocated to the mobile phone from the channels for mobile phone service, the number of adjustment channels being less than the number of the allocated available channels, the mobile phone including an non-volatile memory stored with respective transmission automatic gain control (AGC) level values for the adjustment channels derived in accordance with an adjustment for transmission power to an optimum level for each of the adjustment channels, comprising:

an offset value processing procedure for reading out the transmission AGC level values from the non-volatile memory, and deriving offset values corresponding to respective differences between the transmission AGC level value of the reference channel and respective transmission AGC level values of the remaining adjustment channels; and a compensation value processing procedure for deriving a compensation value for a currently available channel, based on the offset values of adjustment channels located above and below the currently available channel, the channel span between the currently available channel and the adjustment channel located below it, and the channel span between the adjustment channels located above and below the currently available channel, while using the following expression:

$$\text{ch\_pwr\_offset} = \frac{(\text{max\_ch\_offset} - \text{min\_ch\_offset})}{\text{span}} \times (ch - \text{min\_ch}) + \text{min\_ch\_offset}$$

where "ch_pwr_offset" represents the compensation value, "max_ch_offset" and "min_ch_offset" represent the offset values of the adjustment channels located above and below the currently available channel respectively; "span" represents the channel span between the adjustment channel located above the available channel and the adjustment channel located below the available channel, "ch" represents the channel number of the currently available channel, and "min_ch" represents the channel number of the adjustment channel located below the available channel. The adjustment channel above the currently available channel is the "upper limit adjustment channel" and the adjustment channel below is the "lower limit adjustment channel".

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENT

Reference will now be made in detail to the preferred embodiments of the present invention. In the following description of the preferred embodiment of the present invention, a variety of specific elements such as the number of channels, channel numbers, and other various values are described. The description of such elements has been made only for a better understanding of the present invention. Those skilled in the art will appreciate that the present invention can be implemented without using the above mentioned specific elements. In the following description of the preferred embodiment of the present invention, a detailed description of known functions and configurations incorporated herein will be omitted when it may make the subject matter of the present invention rather unclear. Also, the preferred embodiment will be described in conjunction with an example in which it is applied to mobile phones of a CDMA system.

Figure 1:
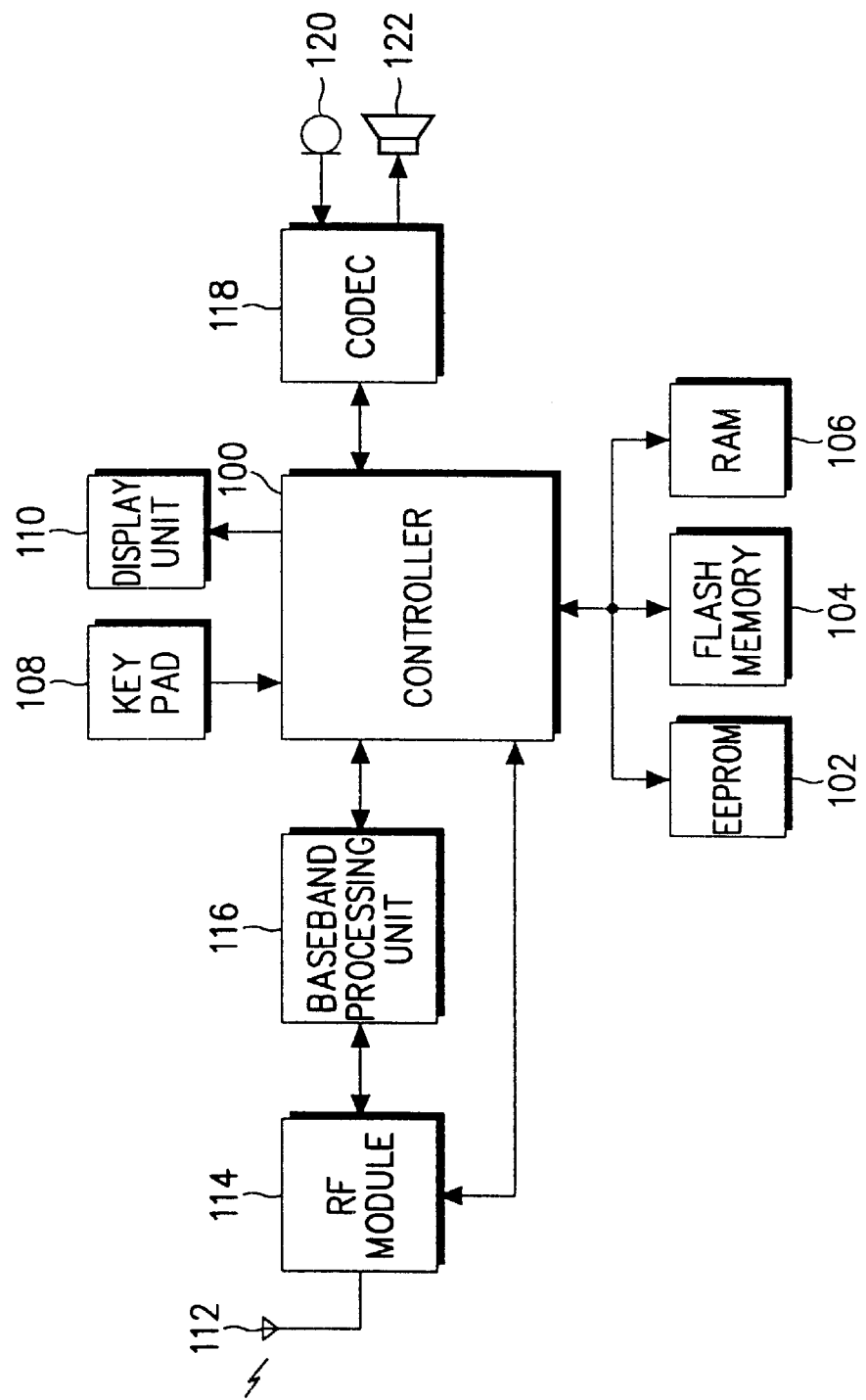
FIG. 1 is a block diagram illustrating the configuration of a mobile phone to which the present invention is applied.

FIG. 1 is a block diagram illustrating the configuration of a mobile phone to which the preferred embodiment of the present invention is applied. Referring to FIG. 1, a control unit 100 is illustrated which directs processing of speech signals and data for general conversations and data communications through the mobile phone while controlling parts of the mobile phone. Connected to the control unit 100 are an EEPROM 102, a flash memory 104, a RAM 106, a key pad 108, a display unit 110, an RF module 114, a baseband processing unit 116, and a coder/decoder (CODEC) 118, as shown in FIG. 1. The control unit 100 may comprise a mobile system modem chip manufactured by, for example, QUALCOMM Company. The mobile system modem chip includes a microprocessor, a CDMA processing unit, and a vocoder. In the following description, processing and control operations of the control unit 100 for general conversations and data communications through the mobile phone and other additional functions, which have no direct relation with the present invention, will not be described.

The EEPROM 102 coupled to the control unit 100 is stored with transmission AGC levels and a variety of reference data. Programs for the processing and control operations of the control unit 100 are stored in the flash memory 104. The RAM 106 provides a working memory for the control unit 100. The key pad 108 is provided with a variety of keys including numeral keys to apply a key input generated by the user to the control unit 100. The display unit 110 is typically provided with an LCD to display a variety of information in the form of an image under the direction of the control unit 100. The RF module 114 conducts transmission and reception of RF signals with a base station over an antenna 112. When the RF module 114 receives an RF signal, it converts the received RF signal into an intermediate frequency (IF) signal, and then sends the IF signal to the baseband processing unit 116. The RF module 114 receives an IF signal from the baseband processing unit 116, and then converts it into an RF signal which is, in turn, transmitted over the antenna 112. The RF module 114 makes transmission power adjustments to the signal to be transmitted.

The baseband processing unit 116 is a baseband analog (BBA) ASIC providing an interface between the control unit 100 and the RF module 114. This baseband processing unit 116 converts a digital baseband signal into an analog IF signal which is, in turn, applied to the RF module 114. The baseband processing unit 116 also converts an analog IF signal received from the RF module 114 into a digital baseband signal which is, in turn, applied to the control unit 100. The CODEC 118 connected to the control unit 100 is coupled to a microphone 120 and a speaker 122. The CODEC 118 encodes speech signals received from the microphone 120 in accordance with a pulse code modulation (PCM) encoding method, and then sends the resultant speech data to the control unit 100. The CODEC 118 also PCM-decodes speech data received from the control unit 100, and then sends the resultant speech signal to the speaker 122.

Figure 2:
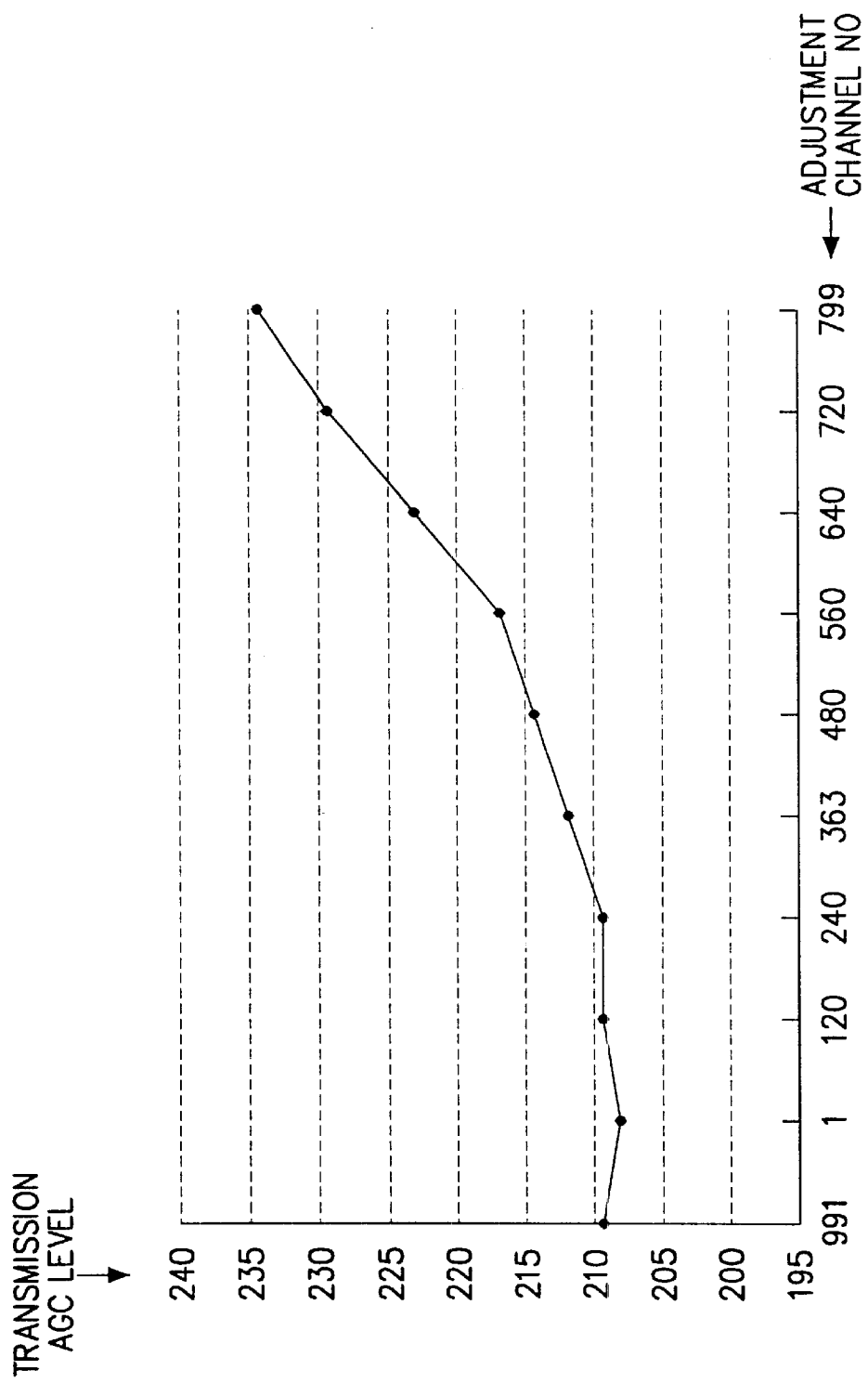
FIG. 2 is a graph of the line used for a transmission AGC level comparison among adjustment channels in accordance with the preferred embodiment of the present invention.

The transmission AGC levels stored in the EEPROM 102, which is a non-volatile memory, are those obtained after adjusting transmission power for adjustment channels to optimum levels. The number of the adjustment channels is less than the number of available channels associated with the mobile phone. In the preferred embodiment of the present invention, 10 adjustment channels, the number of which corresponds to half the number of available channels, that is, 20, as mentioned above, are selected from AMPS channels. The transmission AGC levels practically measured for the adjustment channels are described in Table 1. Also, FIG. 2 is a graph of the line used for a transmission AGC level comparison among the adjustment channels.

TABLE 1

| Adjustment Channel No. | Transmission AGC Level |
|---|---|
| 991 | 209 |
| 1 | 208 |
| 120 | 209 |
| 240 | 209 |
| 363 | 212 |
| 480 | 214 |

TABLE 1-continued

| Adjustment Channel No. | Transmission AGC Level |
| --- | --- |
| 560 | 217 |
| 640 | 223 |
| 720 | 229 |
| 799 | 234 |

The values of transmission AGC levels described in Table 1 are applied to the RF module 114. These values may vary depending on the hardware or characteristics of the RF module 114. Between the 10 adjustment channels and the 20 available channels, there is only one common channel. The number of the common channel is 363. The adjustment channels other than the adjustment channel number 363, are not available channels, that is, channels for voice or data transmission by the mobile phone. Accordingly, the adjustment channel No. 363 is used as the reference channel for conducting transmission power compensation for the available channels.

Each of the available channels exists between two adjustment channels in channel number. In this regard, the transmission AGC level of an available channel can be derived from the transmission AGC levels of the upper and lower limit adjustment channels, located above and below, respectively, the available channel in channel number. If the transmission AGC level difference between the currently available channel and the reference channel is known, it is then possible to make a compensation for the transmission power deviation of the currently available channel by using the known transmission AGC level difference as an offset value from the transmission AGC level of the reference channel. That is, the transmission AGC level difference between the currently available channel and the reference channel is a compensation value used to adjust the currently available channel for the transmission power deviation. This compensation value may be referred to as a "channel power offset value" because it is an offset to the transmission AGC level of the reference channel. When the currently available channel is the reference channel, it is unnecessary to derive the compensation value because the transmission AGC level of the reference channel is the same as that of the currently available channel.

The offset value for each adjustment channel from the reference channel, which corresponds to the transmission AGC level difference between each adjustment channel and the reference channel, is described in Table 2.

TABLE 2

| Adjustment Channel | Transmission AGC Level Value | Offset Value |
| --- | --- | --- |
| 991 | 209 | −3 |
| 1 | 208 | −4 |
| 120 | 209 | −3 |
| 240 | 209 | −3 |
| 363 | 212 | 0 |
| 480 | 214 | 2 |
| 560 | 217 | 5 |
| 640 | 223 | 11 |
| 720 | 229 | 17 |
| 799 | 234 | 22 |

Figure 3:
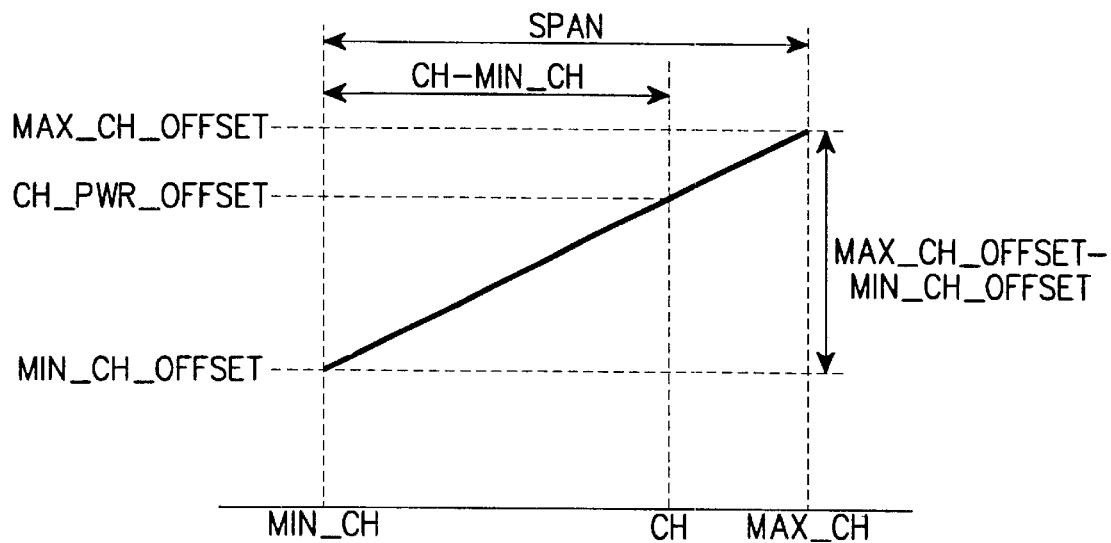
FIG. 3 is a diagram illustrating a compensation value calculation according to the preferred embodiment of the present invention.

In order to appropriately compensate for transmission power deviations of channels, it is necessary to accurately and efficiently derive compensation values for the available channels. A method for deriving compensation values in accordance with the preferred embodiment of the present invention will now be described in conjunction with FIG. 3. In FIG. 3, "ch" denotes the number of the currently available channel for which a compensation value needs to be derived. "max_ch" and "min_ch" represent upper and lower limit adjustment channels located above and below respectively, the currently available channel current_ch in channel number. "span" represents the channel span between the upper and lower limit adjustment channels max_ch and min_ch. For example, when the currently available channel numbers is 193, it exists between the adjustment channel numbers 120 and 240, as shown in Table 1. Accordingly, the upper and lower limit adjustment channel numbers, associated with the currently available channel are 120 and 240, respectively. In this case, therefore, the channel span corresponds to 120 (240−120=120). In FIG. 3, "min_ch_offset" and "max_ch_offset" represent the offset values of the upper and lower limit adjustment channels from the reference channel, as described in Table 2. "ch_pwr_offset" is the channel power offset value and represents the compensation value used for compensating for a transmission power deviation of the currently available channel.

As shown in FIG. 3, the compensation value ch_pwr_offset can be expressed by a general linear equation, that is, "y=mx+b" (where, "m" represents the slope, and "b" represents the offset value of the lower limit adjustment channel). Accordingly, the compensation value ch_pwr_offset can be derived from the following Expression 1:

$$\text{ch\_pwr\_offset} = \frac{(\text{max\_ch\_offset} - \text{min\_ch\_offset})}{span} \times (ch - \text{min\_ch}) + \text{min\_ch\_offset}$$ [Expression 1]

From the compensation value derived using the upper and lower limit adjustment channel numbers associated with the currently available channel along with the respective offset values for those upper and lower limit adjustment channels, it is possible to derive an accurate transmission AGC level meeting the characteristics of the currently available channel. Thus, respective compensation values for the 20 available channels can be derived. Accordingly, the transmission AGC levels of the 20 available channels can be derived by adding the compensation values for the 20 available channels to the transmission AGC level of the reference channel, that is, adjustment channel number 363. The derived transmission AGC levels of the 20 available channels are depicted by the line on the graph shown in FIG. 2. Since transmission power deviations of channels can be accurately and efficiently adjusted using the above mentioned method, it is possible to store the measured transmission AGC levels of only 10 adjustment channels, half the number of available channels, in the EEPROM 102. Accordingly, it is possible to minimize transmission power deviations of channels while simplifying and reducing the processes conducted by the manufacturer.

In order to derive the compensation value ch_pwr_offset using Expression 1, it is necessary to first derive the lower limit adjustment channel number, min_ch, and the channel span, span. The values are derived at the manufacturing end through an appropriate calculation. The derived values can be arranged in an appropriate table where indexes correspond to each lower limit adjustment channel and its respective channel span. An example of such a table is Table 3. Table 3 shows the index values with their respective lower limit adjustment channel numbers, min_ch, and respective indexed channel spans, span, as well as the 20 available channels associated with the index values.

TABLE 3

| Available Channel | Index | Min_ch | Span |
|---|---|---|---|
| 1011 | 0 | 991 | 33 |
| 29, 70, 111 | 1 | 1 | 119 |
| 152, 193, 234 | 2 | 120 | 120 |
| 275, 316 | 3 | 240 | 123 |
| 363 | | | |
| 404, 445 | 4 | 363 | 117 |
| 486, 527 | 5 | 480 | 80 |
| 568, 609 | 6 | 560 | 80 |
| 650, 697 | 7 | 640 | 80 |
| 738, 779 | 8 | 720 | 79 |

In Table 3, adjustment channel 363 has no index because it is the reference channel, thus it requires no compensation. Furthermore, the span of channel 991 is 33 because channel 1 is equivalent to 1024. When it is desired to derive a compensation value for a currently available channel in a mobile phone, this can be simply achieved using such a table in which the lower limit adjustment channel numbers, min_ch, and channel spans, span, are arranged while being allocated with indexes in such a fashion that each available channel corresponds to one index. Thus, if only the index of the currently available channel is derived, min_ch and span can be found in an array corresponding to Table 3. Accordingly, it is not necessary to perform a separate calculation in order to find min_ch and span, when these values are needed to perform the calculation shown in Expression 1.

An example of an array for lower limit adjustment channel numbers, min_ch, is as follows:

int2 ch_comp_min_ch[9]={991, 1, 120, 240, 363, 480, 560, 640, 720}

An example of an array for channel spans, span, is as follows:

int2 ch_comp_span[9]={33, 119, 120, 123, 117, 80, 80, 79}

The constants min_ch and span are included in the program of the controller 100, as shown below in regards to FIG. 5, as arrays and the program is stored in the flash memory 104.

Now, the method of compensating for transmission power deviations of channels in accordance with the preferred embodiment of the present invention will be described in conjunction with FIG. 4, which illustrates an offset value processing procedure, along with FIG. 5, which illustrates a compensation value processing procedure.

Figure 4:
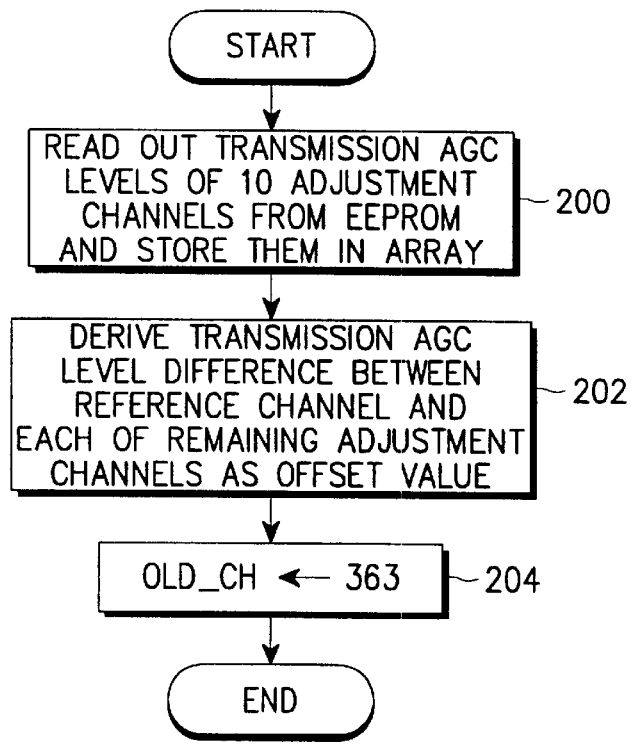
FIG. 4 is a flow chart illustrating an offset value processing procedure according to the preferred embodiment of the present invention.

The offset value processing procedure shown in FIG. 4 is conducted by the controller 100 every time the mobile phone of FIG. 1 turns on. On the other hand, the compensation value processing procedure shown in FIG. 5 is periodically conducted at predetermined time intervals. For example, the compensation value processing interval can be set to coincide with the transmission power adjustment processing interval. In this case, the compensation value processing interval is set by 1.25 ms, because the base stations of the current CDMA system conduct transmission power adjustment processing intervals of 1.25 ms. In the offset value processing procedure of FIG. 4, which is conducted every time the mobile phone turns on, the offset values are calculated and stored in the RAM 106, where they will be kept unless the mobile phone turns off.

First, the offset value processing procedure will be described in conjunction with FIG. 4. When the mobile phone turns on, the control unit 100 reads the transmission AGC level values, as described in Table 1, the adjustment channels from the EEPROM 102 at step 200, as shown in FIG. 4. The read-out transmission AGC level values are then stored in the form of an array in the RAM 106. Thereafter, an offset value for each adjustment channel is derived by calculating the transmission AGC level difference between the reference channel and the adjustment channel at step 202. Offset values derived for all the adjustment channels, as described in Table 2, are then also stored in the form of an array in the RAM 106. Next, the number of the reference channel, in this case, 363, is stored as the parameter old_ch in the RAM 106 at step 204. Thus, the offset value processing procedure is ended.

Figure 5:
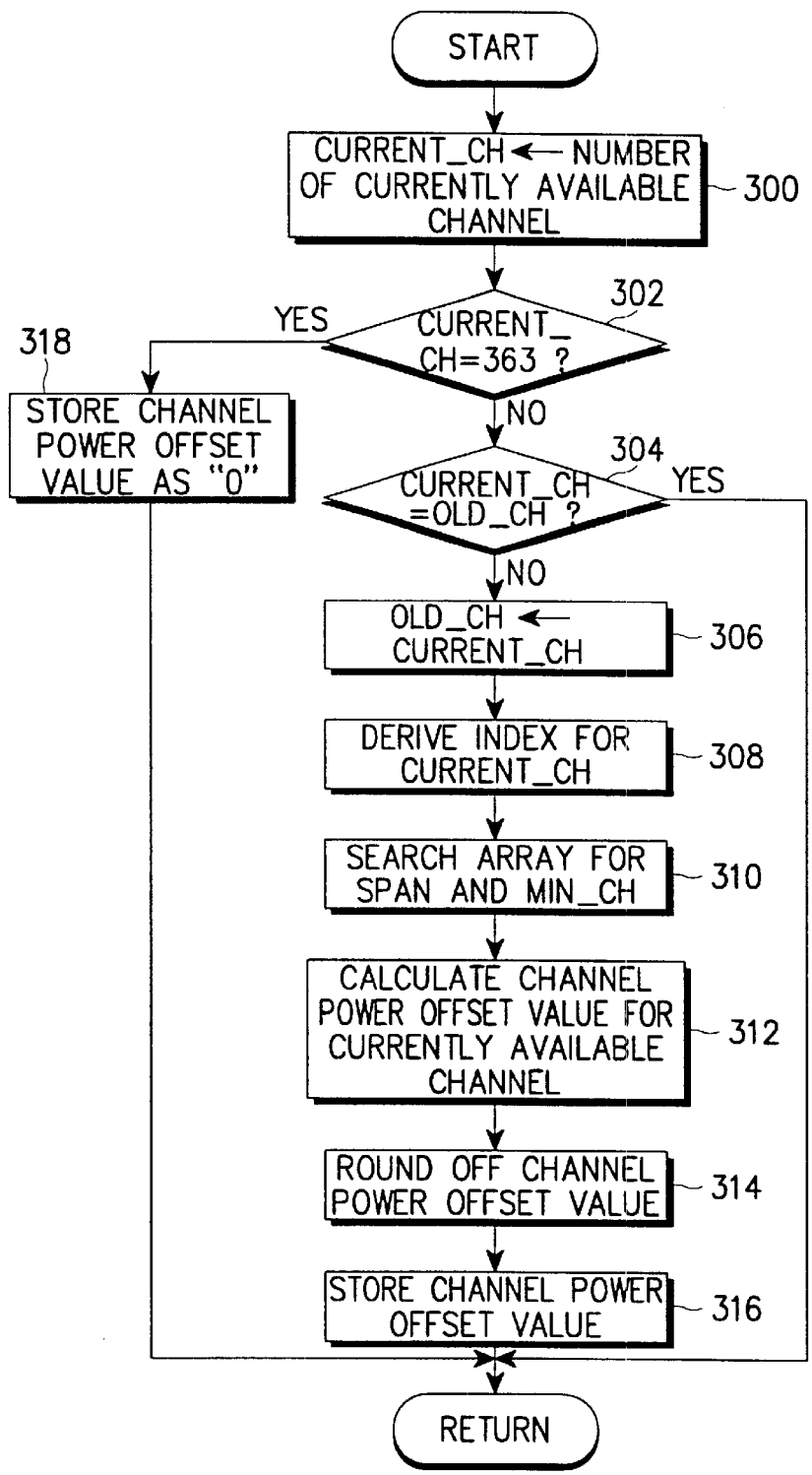
FIG. 5 is a flow chart illustrating a compensation value processing procedure according to the preferred embodiment of the present invention.

The offset values derived when the mobile phone turns on are used in the compensation value processing procedure of FIG. 5, which is conducted at predetermined time intervals.

In accordance with the compensation value processing procedure of FIG. 5, the controller 100 stores the number of the currently available channel as a parameter current_ch at step 300 when a predetermined compensation value processing interval begins. It is then checked at step 302 whether or not the parameter current_ch, namely, the number of the currently available channel, is 363. If the currently available channel number current_ch is 363, it is unnecessary to conduct any transmission power consumption because the currently available channel is the reference channel. In this case, a value of 0 is stored as the channel power offset value, which is a compensation value for the currently available channel, at step 318. Thereafter, the procedure returns to a normal routine. On the other hand, if it is determined at step 302 that the currently available channel number current_ch does not correspond to 363, the procedure proceeds to step 304. At step 304, it is checked whether or not the currently available channel number current_ch, equals the parameter old_ch. If the current available channel number, current_ch, equals the parameter old_ch, the previous compensation value can be used as the current compensation value because there is no channel change. In this case, the procedure returns to the normal routine because no compensation value calculation is required. On the other hand, if it is determined at step 304 that the current available channel number, current_ch, does not equal the parameter old_ch, steps 306 to 316 are executed in order to derive a new compensation value.

At step 306, the currently available channel number, current_ch, is stored as the parameter old_ch. That is, the parameter old_ch is updated with the currently available channel number, current_ch. At step 308, the index for the currently available channel number, current_ch, is then derived. The index value is programmed to be calculated by the available channel numbers, and included in the program of the controller 100 shown in FIG. 1. Using the derived index, the above mentioned array is then searched for the channel span, span, and lower limit adjustment channel number, min_ch, associated with the current available channel step 310.

Thereafter, max_ch_offset and min_ch_offset (respectively corresponding to max_ch and min_ch) are retrieved from among the offset values stored in RAM 106. Then, the channel power offset value, which is the compensation value for the currently available channel, is calculated at step 312, based on the derived channel span, span, lower limit adjustment channel number, min_ch, and offset values min_ch_offset and max_ch_offset using Expression 1.

The calculated channel power offset value can be calculated to several decimals. In the preferred embodiment, these decimal values are used in rounding off the channel power offset value, in step 314. This use of the decimal values results in the enhanced accuracy of the channel power offset value. This rounded-off channel power offset value is stored at step 316 so that it can be used for transmission power compensation for the currently available channel. Thereafter, the procedure returns to the normal routine.

As mentioned above, the compensation value for the currently available channel is derived, based on the relation of the currently available channel with the adjustment channels above and below the currently available channel and the respective transmission AGC level differences of those adjustment channels from the reference channel. Using this comparison value, it is possible to obtain an accurate transmission AGC level of the currently available channel that meets the characteristics of the current available channel. This makes it possible to store only the measured transmission AGC levels of the adjustment channels, the number of which corresponds to half the number of available channels, in an EEPROM. Accordingly, it is possible to minimize the transmission power deviations of channels while simplifying and reducing the processes conducted by the manufacturer.

As apparent from the above description, the preferred embodiment of the present invention provides advantages in that it uses adjustment channels, the number of which is less than the number of available channels, while deriving an accurate compensation value for a currently available channel by use of the upper and lower limit adjustment channel numbers associated with the currently available channel along with respective offset values for the upper and lower limit adjustment channels, thereby minimizing and efficiently compensating for the transmission power deviation of the currently available channel.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims. Although the compensation value processing procedure has been described as being conducted at predetermined time intervals, and the offset value processing procedure has been described as being conducted only when the mobile phone turns on, the present invention is not limited to such conditions. Other conditions for those procedures may be used as long as the offset value processing procedure is conducted prior to the compensation value processing procedure. In the preferred embodiment, the processing step for determining whether or not a channel change is made and the processing step for determining whether or not the currently available channel is the reference channel are conducted in order to reduce the amount of calculation required. However, these processing steps may be eliminated. In addition, although the number of adjustment channels in the preferred embodiment equals half the number of available channels, the present invention is not limited to that ratio of adjustment channels to available channels.

What is claimed is:

1. A method for compensating transmission power deviations of channels in a mobile phone using adjustment channels selected from channels for mobile phone services while including a reference one of available channels allocated to the mobile phone from the channels for mobile phone services, the number of the adjustment channels being less than the number of the allocated available channels, the mobile phone including a non-volatile memory stored with respective transmission automatic gain control (AGC) level values for the adjustment channels, said transmission AGC level values derived at an optimum level for each of the adjustment channels, the method comprising:

an offset value processing procedure for reading out the transmission AGC level values from the non-volatile memory, and deriving offset values corresponding to respective differences between the transmission AGC level value of the reference channel and respective transmission AGC level values of the remaining adjustment channels; and a compensation value processing procedure for deriving a compensation value for a currently available one of the allocated available channels, based on offset values of upper and lower limit adjustment channels, located above and below the currently available channel, respectively, a channel span between the currently available channel and lower limit adjustment channel, and a channel span between the upper and lower limit adjustment channels, while using the following expression:

$$\text{ch\_pwr\_offset} = \frac{(\text{max\_ch\_offset} - \text{min\_ch\_offset})}{\text{span}} \times (ch - \text{min\_ch}) + \text{min\_ch\_offset}$$

where, "ch_pwr_offset" represents the compensation value, "max_ch_offset" and "min_ch_offset" represent the offset values of the upper and lower limit adjustment channels, respectively, "span" represents the channel span between the upper and lower limit adjustment channels, "ch" represents the channel number of the currently available channel, and "min_ch" represents the channel number of the lower limit adjustment channel.

2. The method according to claim 1, wherein the number of the adjustment channels corresponds to half the number of the available channels.

3. The method according to claim 1, wherein respective channel spans between the upper and lower limit adjustment channels and respective lower limit adjustment channel numbers associated with each available channel except for the reference channel, are stored in an array and allocated with indexes, each index corresponding to at least one of the available channels.

4. The method according to claim 3, wherein the channel span and the lower limit adjustment channel number associated with the currently available channel are derived by deriving an index of the currently available channel, and searching the array for the channel span and the lower limit adjustment channel number associated with the index of the currently available channel.

5. The method according to claim 2, wherein the derived compensation value is rounded off.

6. A method for compensating transmission power deviations of channels in a mobile phone using adjustment channels selected from channels for mobile phone services while including a reference one of available channels allocated to the mobile phone from the channels for mobile phone services, the number of the adjustment channels being less than the number of the allocated available channels, the mobile phone including a non-volatile memory stored with respective transmission automatic gain control (AGC) level values for the adjustment channels, said transmission AGC level values derived at an optimum level for each of the adjustment channels, the method comprising:

an offset value processing procedure for reading out the transmission AGC level values from the non-volatile memory when the mobile phone turns on, and deriving offset values corresponding to respective differences between the transmission AGC level value of the reference channel and respective transmission AGC level values of the remaining adjustment channels;

a compensation value processing procedure for deriving, at intervals of a predetermined time, a compensation value for a currently available one of the allocated available channels, based on offset values of upper and lower limit adjustment channels, above and below the currently available channel, respectively, a channel span between the currently available channel and the upper and lower limit adjustment channel, and a channel span between the upper and lower adjustment channels, while using the following expression:

$$\text{ch\_pwr\_offset} = \frac{(\text{max\_ch\_offset} - \text{min\_ch\_offset})}{\text{span}} \times (ch - \text{min\_ch}) + \text{min\_ch\_offset}$$

where, "ch_pwr_offset" represents the compensation value, "max_ch_offset" and "min_ch_offset" represent the offset values of the upper and lower limit adjustment channels, respectively, "span" represents the channel span between the upper and lower limit adjustment channels, "ch" represents the channel number of the currently available channel, and "min_ch" represents the channel number of the lower limit adjustment channel.

7. The method according to claim 6, further comprising the steps of:

at every predetermined time interval, checking whether or not the currently available channel corresponds to the reference channel;

when the currently available channel corresponds to the reference channel, determining the compensation value for the currently available channel to be "0";

when the currently available channel does not correspond to the reference channel, checking whether or not the currently available channel corresponds to the available channel that was checked in the last predetermined time period;

when the currently available channel does not correspond to the previous available channel, executing the compensation value processing procedure for the currently available channel, and updating the compensation value previously derived for the previous available channel with the currently derived compensation value; and when the currently available channel corresponds to the previous available channel, keeping the compensation value previously derived for the previous available channel, so that the previously derived compensation value is used as a compensation value for the currently available channel.

8. The method according to claim 7, wherein the number of the adjustment channels corresponds to half the number of the available channels.

9. The method according to claim 8, wherein respective channel spans between the upper and lower limit adjustment channels and respective lower limit adjustment channel numbers associated with each available channel, except for the reference channel, are stored in an array and allocated with indexes, each index corresponding to at least one of the available channels.

10. The method according to claim 9, wherein the channel span and the lower limit adjustment channel number associated with the currently available channel are derived by deriving the index of the currently available channel, and searching the array for the channel span and the lower limit adjustment channel number associated with the index of the currently available channel.

11. The method according to claim 8, wherein the derived compensation value is rounded off.

12. A method for compensating for transmission power deviations of channels in a mobile phone having allocated available channels selected from channels for mobile phone services, comprising the steps of:

selecting adjustment channels from the channels for mobile phone services;

selecting at least one reference channel from the allocated available channels;

deriving transmission automatic gain control (AGC) level values for the adjustment channels and the at least one reference channel; and deriving an offset value for each adjustment channel consisting of a difference between the transmission AGC level value of said adjustment channel and the transmission AGC level value of the at least one reference channel.

13. The method as recited in claim 12, wherein only the at least one reference channel is both an allocated available channel and an adjustment channel.

14. The method according to claim 12, comprising the further step of:

deriving a compensation value for a currently available channel of the allocated available channels.

15. The method according to claim 14, further comprising the steps of:

deriving a channel span between each adjustment channel and an adjustment channel above each said adjustment channel.

16. The method as recited in claim 15, wherein the step of deriving a compensation value consists of:

finding a lower adjustment channel below the currently available channel;

finding an upper adjustment channel above the currently available channel;

finding the channel span between the lower adjustment channel and an adjustment channel above the lower adjustment channel;

finding an offset span consisting of a difference between the offset value of an upper adjustment channel and the offset value of the lower adjustment channel;

finding a current channel span between the currently available channel and the lower adjustment channel; and performing the following calculation:

$$\text{Compensation Value} = \frac{\text{Offset Span}}{\text{Span}} \times \text{Current Channel Span} + \text{Lower Adjustment Channel}$$

where, "Lower Adjustment Channel" represents the offset value of the lower adjustment channel.

17. The method as recited in claim 12, wherein the step of deriving an offset value is performed each time the mobile phone is turned on.

18. The method as recited in claim 17, wherein the derived offset values are stored in a volatile memory.

19. The method as recited in claim 12, wherein the derived AGC values are stored in a non-volatile memory.

20. The method as recited in claim 14, wherein the step of deriving a compensation value is performed at predetermined time intervals.

21. The method as recited in claim 15, wherein the derived channel spans are stored in a non-volatile memory.

22. The method as recited in claim 15, comprising the further steps of:

storing the derived transmission AGC level values in a non-volatile memory;

storing the derived offset values in a volatile memory;

setting an index value corresponding to each adjustment channel and the channel span of said adjustment channel; and setting one of said index values for each of the allocated available channels.

23. The method as recited in claim 22, wherein the step of deriving a compensation value comprises the steps of:

finding the index value for said currently available channel, wherein the adjustment channel corresponding to the index value is a lower adjustment channel;

finding an upper adjustment channel as an adjustment channel above the lower adjustment channel;

finding an offset span consisting of a difference between the offset value of an upper adjustment channel and the offset value of the lower adjustment channel;

finding a current channel span between the currently available channel and the lower adjustment channel; and performing the following calculation:

$$\text{Compensation Value} = \frac{\text{Offset Span}}{\text{Span}} \times \text{Current Channel Span} + \text{Lower Adjustment Channel}$$

where, "Lower Adjustment Channel" represents the offset value of the lower adjustment channel.

* * * * *